United States Patent
Duffau

(10) Patent No.: US 12,023,973 B2
(45) Date of Patent: Jul. 2, 2024

(54) SUSPENSION ELEMENT OF A VEHICLE

(71) Applicant: Nissan Motor Co., Ltd., Kanagawa (JP)

(72) Inventor: Benjamin Duffau, Voisins le Bretonneux (FR)

(73) Assignee: Nissan Motor Co., Ltd., Kanagawa (JP)

( * ) Notice: Subject to any disclaimer, the term of this patent is extended or adjusted under 35 U.S.C. 154(b) by 71 days.

(21) Appl. No.: 17/595,485

(22) PCT Filed: May 7, 2020

(86) PCT No.: PCT/EP2020/062691
§ 371 (c)(1),
(2) Date: Nov. 17, 2021

(87) PCT Pub. No.: WO2020/233995
PCT Pub. Date: Nov. 26, 2020

(65) Prior Publication Data
US 2022/0227193 A1  Jul. 21, 2022

(30) Foreign Application Priority Data
May 17, 2019 (FR) ...................................... 1905206

(51) Int. Cl.
*B60G 11/14* (2006.01)
*B60G 15/06* (2006.01)

(52) U.S. Cl.
CPC ............ *B60G 11/14* (2013.01); *B60G 15/062* (2013.01); *B60G 2202/12* (2013.01); *B60G 2202/312* (2013.01); *B60G 2204/124* (2013.01)

(58) Field of Classification Search
CPC .. B60G 11/14; B60G 15/062; B60G 2202/12; B60G 2202/312; B60G 2204/124; B60G 2204/12422
See application file for complete search history.

(56) References Cited

U.S. PATENT DOCUMENTS 11,046,141 B2 * 6/2021 Schmidt ................. B60G 11/16
2016/0052358 A1 * 2/2016 Itsuji ....................... B60G 11/52
267/33

FOREIGN PATENT DOCUMENTS

DE 102017209078 A1 * 12/2018
EP 2969607 B1 * 7/2017 ............. B60G 11/16
(Continued)

OTHER PUBLICATIONS

DE-102017209078-A1 Machine English translation (Year: 2018).*
FR-2973738-A1 Machine English translation (Year: 2012).*
EP-2969607-B1 Machine English translation (Year: 2017).*

*Primary Examiner* — Jason D Shanske
*Assistant Examiner* — Matthew James O'Neill
(74) *Attorney, Agent, or Firm* — Osha Bergman Watanabe & Burton LLP

(57) ABSTRACT

A suspension element of a vehicle includes a coil spring, and a bearing part provided with a main stop. The spring is mounted on the bearing part in such a manner that a first end of the spring comes to bear against the main stop. The bearing part includes a secondary stop placed in front of the main stop, against which secondary stop the first end of the spring bears during a method for assembling the suspension element. The secondary stop is capable of moving away under the effect of pressure exerted by the spring on the secondary stop during a stage of compressing the spring after the spring has pivoted about the spring's rotational axis during a stage involving straightening the spring, so that a second end of the spring is made to interact with a centering element, in order to come to bear against the main stop.

12 Claims, 6 Drawing Sheets

(56) References Cited

FOREIGN PATENT DOCUMENTS

Figure 1:
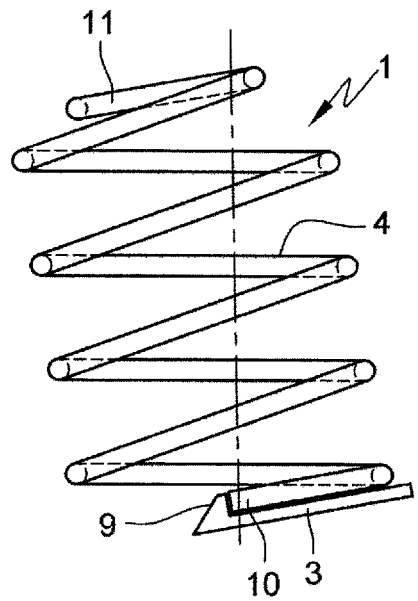

FR 2973738 A1 * 10/2012 ........... B60G 15/063
FR 2973738 A1 10/2012

* cited by examiner

SUSPENSION ELEMENT OF A VEHICLE

The present invention relates to a suspension element of a vehicle.

A suspension element of this kind, which may be composed of a strut, for example, broadly speaking includes a suspension coil spring, a bearing part provided with a stop, and a centering part. The spring is disposed in the suspension element in such a manner that a first end of the spring comes to bear against the stop of the bearing part, and in such a manner that a second end of the spring supports a centering part.

In other words, a method for assembling this suspension element generally includes the following stages:

- A stage of positioning the spring on the bearing part in such a manner that its first end comes to bear against the stop,
- A stage involving straightening the spring while keeping it in contact with the bearing part, in order to mount the centering part on the second end of the spring,
- A stage of compressing the assembly.

Broadly speaking, the stage involving straightening the spring is based on a pivoting of the spring, enabling it to move from an inclined position with respect to its operating axis to an aligned position on the operating axis.

During this assembly method, the coil spring must maintain its angular position. In terms of design issues, it is common, however, that during the stage involving straightening the spring, the spring pivots slightly about its rotational axis, such that during the compression stage the first end of the spring no longer comes to bear against the stop, but on top of the stop. The spring is then wrongly positioned with respect to the bearing part, because the stop no longer effectively performs its angular blocking role for the spring. This results in an assembly of this kind being unsatisfactory, as it may lead to a migration of the spring beyond the bearing part, or even to a breakage of the spring.

A suspension element according to the invention is designed to allow the spring to be well positioned in the bearing part during the compression stage, despite there being a slight pivoting movement of the spring about its rotational axis during the preceding stage involving straightening the spring.

In order to correctly evaluate the scope of the invention, it is assumed that the suspension element includes the spring, the bearing part, and the centering part.

One object of the invention is a suspension element of a vehicle, including a coil spring, and a bearing part provided with a main stop, the spring being mounted on the bearing part in such a manner that a first end of the spring comes to bear against the main stop.

According to the invention, the bearing part includes a secondary stop placed in front of the main stop, against which secondary stop the first end of the spring bears during a method for assembling the suspension element, the secondary stop being capable of moving away under the effect of pressure exerted by the spring on the secondary stop during a stage of compressing the spring after the spring has pivoted about its rotational axis during a stage involving straightening the spring, so that a second end of the spring is made to interact with a centering element, in order to come to bear against the main stop.

In other words, the secondary stop overrides the main stop at least temporarily during a method for assembling the suspension element. In fact, during a method for assembling the suspension element, the first end of the spring bears against the secondary stop. At the stage involving straightening the spring during this method, if the spring does not turn, its first end will once again bear against the secondary stop during the compression stage. This is the normal, everyday configuration. By contrast, if the spring accidentally pivots during this stage involving straightening the spring, it will come to bear on the secondary stop, which will then move away to allow the first end of the spring to come to bear against the main stop. Therefore, whichever scenario is envisaged, the spring will always be well positioned, since its first end will always bear either against the main stop or against the secondary stop. This first end will therefore never regain its freedom of movement, as is currently the case with methods for assembling a suspension element of this kind. The term "move away" means that the secondary stop does not retain its initial position, either by becoming deformed or by breaking. The pivoting movement of the spring is advantageously effected about its rotational axis. The secondary stop is preferably made of elastomer.

According to a possible characteristic of the invention, the secondary stop is a flexible, thin strip which is on a plane parallel to a face of the main stop, against which the first end of the spring is capable of coming to bear. In this way, the secondary stop is oriented in the same way as the main stop, but is slightly offset with respect to the main stop. For this configuration, the secondary stop will bend under the effect of the pressure exerted on it by the first end of the spring, so that the secondary stop cannot be allowed to prevent the first end from coming to bear against the main stop.

According to a possible characteristic of the invention, the strip has a thickness of between 1 mm and 3 mm. This thickness is preferably equal to 2 mm.

According to a possible characteristic of the invention, the main stop and the secondary stop are separated by a free space. This is because the main stop must not prevent the secondary stop from moving away, and the presence of this space allows the secondary stop to deform or break without being hampered by the main stop.

According to a possible characteristic of the invention, the length of the space separating the main stop and the secondary stop falls between 3 mm and 10 mm. This length is preferably equal to 5 mm.

According to a possible characteristic of the invention, the bottom of the space is situated at a height which is lower than that of the portion of the bearing part that is located behind the secondary stop with respect to the main stop, a recess delimited by a face of the secondary stop being formed at the foot of the secondary stop in the portion, such that the bottom of the recess is situated at the same height as that of the bottom of the space. The presence of the recess on the other side of the secondary stop with respect to the main stop allows deformation of the secondary stop to be facilitated when the first end of the spring exerts pressure on the secondary stop.

According to a possible characteristic of the invention, the depth of the recess with respect to the height of the portion of the bearing part that is located behind the secondary stop falls between 1 mm and 3 mm. The depth of the recess is preferably equal to 2 mm.

According to a possible characteristic of the invention, the strip is capable of bending in the space so that it lies parallel with the bottom of the space when the first end of the spring comes to bear on the secondary stop. In this way, since the secondary stop is thin, once it is on the bottom of the recess parallel to the bottom of the recess, it is not going to disrupt the bearing of the first end of the spring against the main stop.

According to a possible characteristic of the invention, the bearing part is placed in a retainer. This retainer may be a shock-absorber retainer, for example.

Another object of the invention is a method for assembling a suspension element according to the invention.

According to the invention, the method includes the following stages:

- A stage of positioning the spring on the bearing part in such a manner that its first end comes to bear against the secondary stop,
- A stage involving straightening the spring while keeping it in contact with the bearing part, in order to make the centering element interact with the second end of the spring,
- If the spring has pivoted during the stage involving straightening the spring, a stage in which the secondary stop is flattened by the spring to allow the first end of the spring to come to bear against the main stop,
- A stage of compressing the assembly.

The principle of a method of this kind is to allow the first end of the spring always to bear against a stop of the bearing part, whether the spring has pivoted or not during the stage involving straightening the spring. If the spring does not pivot, the main stop is never involved in the method for assembling the suspension element, since the first end of the spring will bear against the second stop during the compression stage. On the other hand, if the spring has pivoted accidentally, the first end of the spring will flatten the secondary stop before coming to bear against the main stop. Advantageously, the pivoting of the spring during the stage involving straightening the spring is effected about its rotational axis.

A suspension element according to the invention has the advantage of allowing the spring always to be well positioned with respect to the bearing part; thanks to a well-judged layout of the bearing part, there is no need for any structural change to be made to the depth thereof. Moreover, a suspension element of this kind has the advantage of possessing constant overall dimensions with respect to the existing suspension elements, while offering additional functionality through the presence of the secondary stop.

Figure 2:
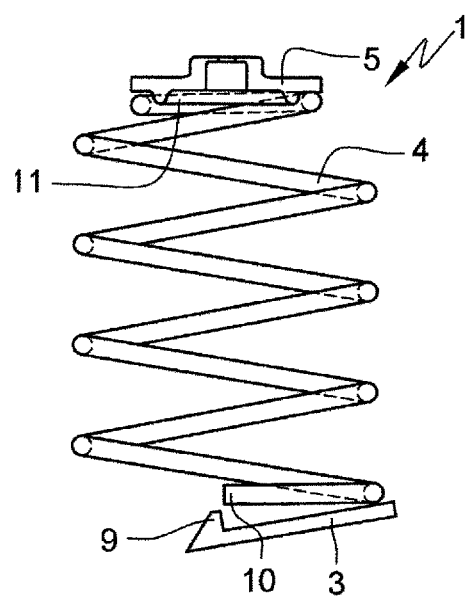
Figure 3:
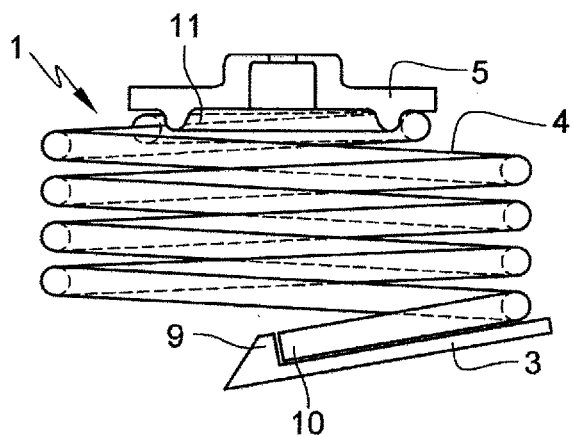
Figure 4:
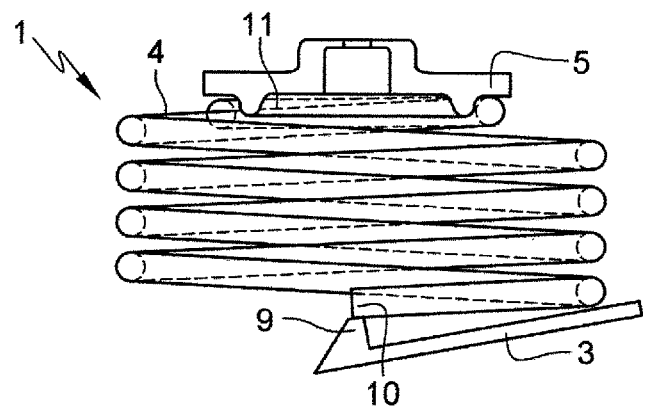
Figure 5:
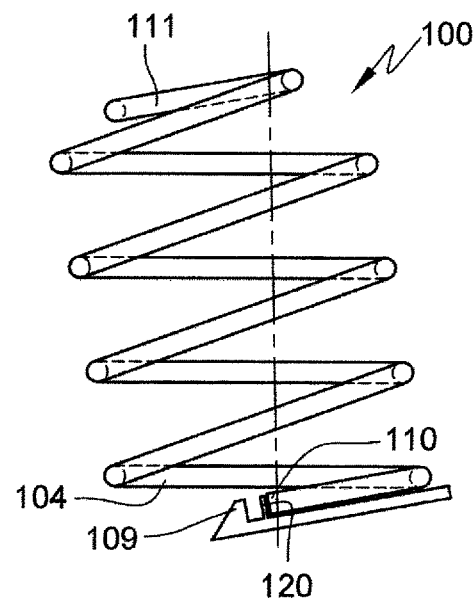
Figure 6:
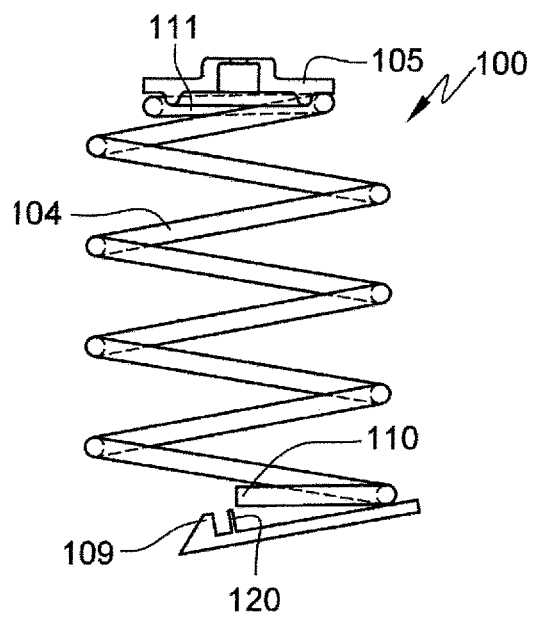
Figure 7:
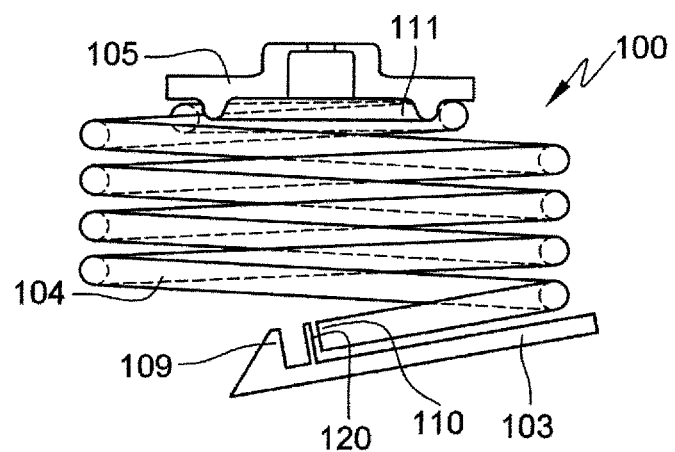
Figure 8:
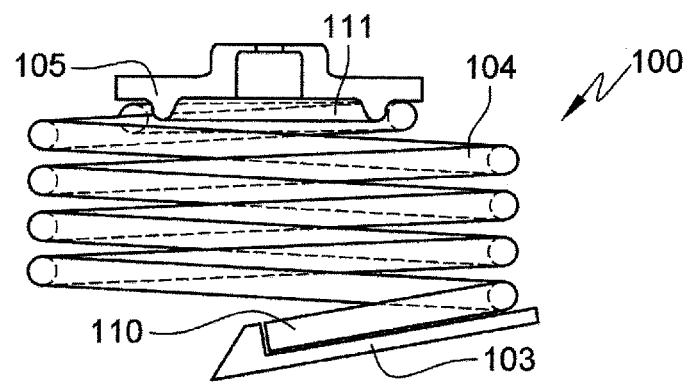
Figure 9:
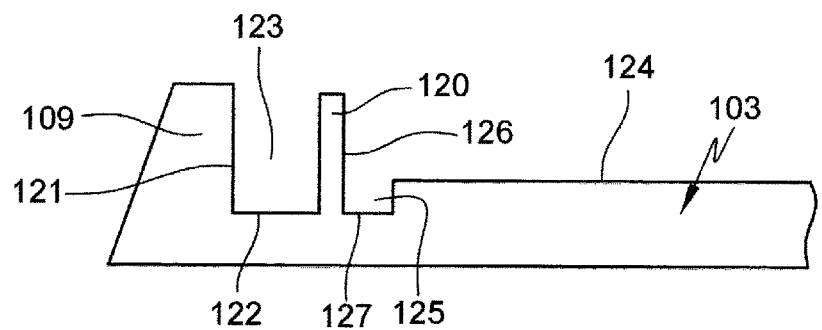
Figure 10:
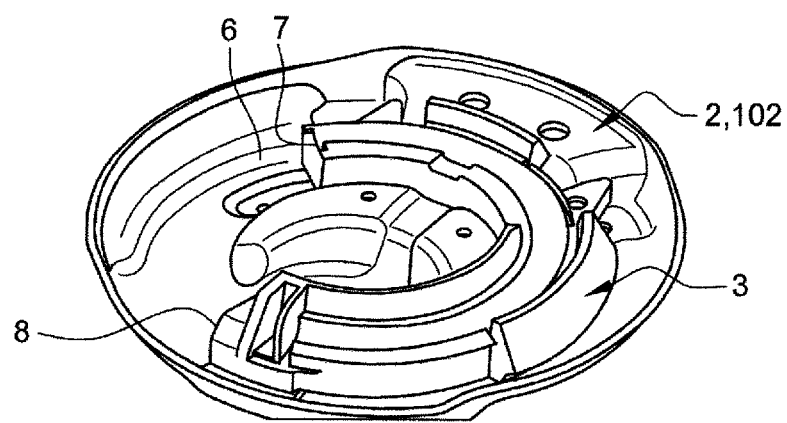
Figure 11:
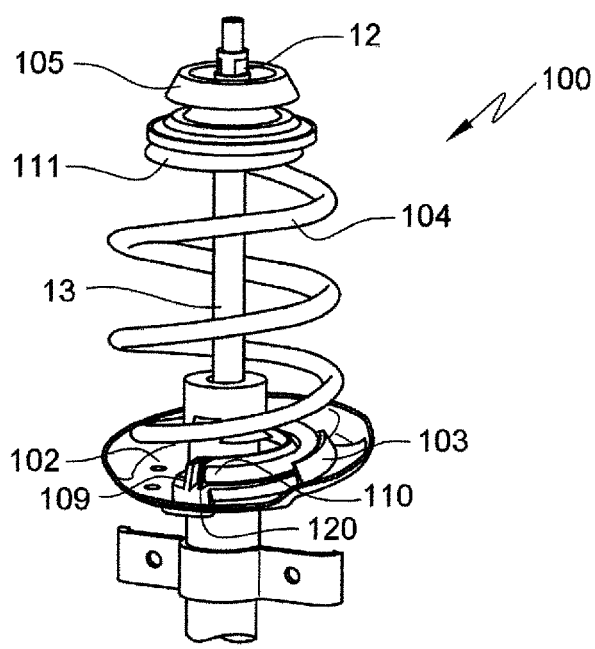

A detailed description is provided below of a preferred embodiment of a suspension element according to the invention with reference to the following figures:

FIG. 1 is a side view of a suspension element according to the prior art illustrating a stage in which one end of the spring is brought to bear against a stop of a bearing part, FIG. 2 is a side view of the suspension element in FIG. 1, illustrating a lifting stage of the spring for assembly of a centering part, FIG. 3 is a side view of the suspension element in FIG. 1, illustrating a compression stage of the spring when the spring has not pivoted, FIG. 4 is a side view of the suspension element in FIG. 1, illustrating a compression stage of the spring when the spring has pivoted, FIG. 5 is a side view of a suspension element according to the invention, illustrating a stage when one end of the spring is brought to bear against a secondary stop of a bearing part, FIG. 6 is a side view of the suspension element in FIG. 5, illustrating a lifting stage of the spring for assembly of a centering part, FIG. 7 is a view of the suspension element in FIG. 5, illustrating a compression stage of the spring when the spring has not pivoted, FIG. 8 is a side view of the suspension element in FIG. 5, illustrating a compression stage of the spring when the spring has pivoted, FIG. 9 is a side view of one end of the bearing part of a suspension element according to the invention, the end including the main stop and the secondary stop, FIG. 10 is a perspective view of a bearing part and a shock-absorber retainer of a suspension element according to the invention, FIG. 11 is a perspective view of a suspension element according to the invention, illustrating a compression stage for the fixing of a nut on a shock-absorber rod.

The detailed description focuses on a particular suspension element that is represented by a strut.

With reference to FIGS. 1, 2, 3 and 4, a strut 1 according to the prior art broadly speaking includes a shock-absorber retainer 2, a bearing part 3, a coil spring 4, and a centering part 5.

With reference to FIG. 10, the shock-absorber retainer is a thin, circular part having an annular groove 6. The bearing part 3 is an open annular part having two ends 7, 8 and covering an angular sector greater than 180°. This bearing part 3 is inserted into the annular groove 6 of the shock-absorber retainer 2.

With reference to FIGS. 1, 2, 3, and 4, the bearing part 3 of a strut 1 according to the prior art includes a main stop 9 against which a first end 10 of the spring 4 is intended to come to bear.

A method for assembling a strut 1 according to the prior art includes the following stages:

- A stage of assembling the bearing part 3 in the shock-absorber retainer 2,
- A stage of positioning the spring 4 on the bearing part 3 in such a manner that its first end 10 comes to bear against the main stop 9, as is illustrated in FIG. 1,
- A stage involving straightening the spring 4 while keeping it in contact with the bearing part 3, in order to mount the centering part 5 on a second end 11 of the spring 4, as is illustrated in FIG. 2,
- A stage of compressing the spring 4 in order to fix a nut 12 of a shock-absorber rod 13, as is illustrated in FIGS. 3 and 4.

If during the stage involving straightening the spring 4, the spring has not accidentally pivoted about its rotational axis, its first end 10 will revert to bearing against the main stop 9 of the bearing part 3 during the compression stage, as is illustrated in FIG. 3.

On the other hand, if during the stage involving straightening the spring, the spring has unfortunately pivoted about its rotational axis, its first end 10 will no longer revert to bearing against the main stop 9 of the bearing part 3 during the compression stage, but will bear on top of the stop 9, as is illustrated in FIG. 4. The result of this is that the first end 10 of the spring 4 is no longer wedged against the main stop 9 of the bearing part 3. Now, this approximate positioning of the spring 4 may cause a displacement of the spring 4 with respect to the shock-absorber retainer 2 and the bearing part 3, and/or noise and/or a breakage of the spring 4.

With reference to FIGS. 5, 6, 7, 8, 9, 10 and 11, in order to prevent poor assembly of this kind from occurring, a strut 100 according to the invention includes a bearing part 103 provided with a secondary stop 120 as an addition to the main stop 109.

With reference to FIG. 9, the secondary stop 120 is composed of a flexible strip placed in front of the main stop 109, at a distance from the main stop 109 falling between 3 mm and 10 mm, and preferably equal to 5 mm. This strip 120 is thin and is on a plane parallel to a planar face 121 of the main stop 109, against which the first end 110 of the spring 104 is intended to come to bear.

Advantageously, the strip 120 has a thickness falling between 1 mm and 3 mm, and preferably equal to 2 mm. The bottom 122 of the space 123 separating the main stop 109 and the secondary stop 120 is situated at a height that is lower than the height of the bottom 124 of the bearing part 103, which is placed on the other side of the flexible strip 120 with respect to the main stop 109. A recess 125 is made in the bottom 124 of the bearing part 103, at the foot of the flexible strip 120, in such a manner that the recess 125 is delimited by a face 126 of the flexible strip 12 and that the bottom 127 of the recess 125 is situated at the same height as that of the bottom 122 of the space 123 separating the two stops 109, 120. This recess 125 is provided to allow bending of the flexible strip 120 when the spring 104 bears on the flexible strip 120.

The main stages of a method for assembling a strut 100 according to the invention are the following:

- A stage of assembling the bearing part 103 in the shock-absorber retainer 102,
- A stage of positioning the spring 104 on the bearing part 103 in such a manner that its first end 110 comes to bear against the secondary stop 120, as is illustrated in FIG. 5,
- A stage involving straightening the spring 104 while keeping it in contact with the bearing part 103, in order to mount the centering part 105 on a second end 111 of the spring 104, as is illustrated in FIG. 6,
- A stage of compressing the spring 104 in order to fix a nut 12 of a shock-absorber rod 13, as is illustrated in FIGS. 7 and 8.

If during the stage involving straightening the spring 104, the spring has not accidentally pivoted about its rotational axis, its first end 110 will revert to bearing against the secondary stop 120 of the bearing part 103 during the compression stage, as is illustrated in FIG. 7. For this configuration, the secondary stop 120 completely overrides the main stop 109 of a strut 1 in the prior art.

On the other hand, if during the stage involving straightening the spring 104, the spring has unfortunately pivoted about its rotational axis, its first end 110 will no longer revert to bearing against the secondary stop 120 of the bearing part 103 during the compression stage, but will bear on top of the secondary stop 120, as is illustrated in FIG. 8. The secondary stop 120, which is composed of a flexible strip, will then bend under the effect of the pressure exerted by the first end 110 of the spring 104. By bending in such a manner, the secondary stop 120 moves away and therefore enables the first end 110 of the spring 104 to come to bear against the main stop 109, as in the case of a strut 1 in the prior art.

The flexible strip is at the same time of such a size as to act as a stop for the first end 110 of the spring 104 and to bend when the first end 110 arrives above this strip 120, by exerting pressure on the strip 120.

The invention claimed is:

1. A suspension element of a vehicle, comprising a coil spring, and a bearing part provided with a main stop, the spring being mounted on the bearing part in such a manner that a first end of the spring contacts the main stop after assembly, the first end of the spring being a surface facing in an axial direction of a coiled wire rod of the spring,
   wherein the bearing part comprises a secondary stop placed between the main stop and the first end of the spring, against which secondary stop the first end of the spring contacts while assembling the suspension element, the secondary stop being capable of moving away under the effect of pressure exerted by the spring on the secondary stop during a stage of compressing the spring after the spring has pivoted about a rotational axis of the spring during a stage involving straightening the spring, so that a second end of the spring is mounted to a centering element, in order for the first end of the spring to contact the main stop, and
   the main stop and the secondary stop extend from a bottom of the bearing part in the same direction.

2. The suspension element as claimed in claim 1, wherein the secondary stop is a flexible and thin strip which is on a plane parallel to a face of the main stop orthogonal to the axial direction of the coiled wire rod of the spring, wherein when the first end contacts the main stop, the first end contacts the face.

3. The suspension element as claimed in claim 2, wherein the strip has a thickness of between 1 mm and 3 mm.

4. The suspension element as claimed in claim 2, wherein the main stop and the secondary stop are separated by a free space in the axial direction of the coiled wire rod of the spring.

5. The suspension element as claimed in claim 4, wherein the length of the space separating the main stop and the secondary stop is greater than or equal to 3 mm and is less than or equal to 10 mm.

6. The suspension element as claimed in claim 4, wherein a bottom of the space is situated at a height which is lower than a height of a portion of the bearing part that is located at the side of the secondary stop towards the first end of the spring with respect to the main stop, and wherein a recess delimited by a face of the secondary stop is formed at a foot of the secondary stop in the portion, such that a bottom of the recess is situated at the same height as that of the bottom of the space.

7. The suspension element as claimed in claim 6, wherein a depth of the recess with respect to the height of the portion of the bearing part is greater than or equal to 1 mm and is less than or equal to 3 mm.

8. The suspension element as claimed in claim 4, wherein the strip is capable of bending in the space so that the strip lies parallel with a bottom of the space under the effect of pressure exerted by the spring on the secondary strip.

9. The suspension element as claimed in claim 1, wherein the bearing part is placed in a retainer.

10. The suspension element as claimed in claim 1, wherein the secondary stop has a surface facing a surface of the main stop in the axial direction of the coiled wire rod of the spring.

11. A method for assembling a suspension element of a vehicle, the suspension element comprising a coil spring, and a bearing part provided with a main stop, the spring being mounted on the bearing part in such a manner that a first end of the spring contacts the main stop after assembly, the first end of the spring being a surface facing in an axial direction of a coiled wire rod of the spring, wherein the bearing part comprises a secondary stop placed between the main stop and the first end of the spring, against which secondary stop the first end of the spring contacts while assembling the suspension element, the secondary stop being capable of moving away under the effect of pressure exerted by the spring on the secondary stop during a stage of compressing the spring after the spring has pivoted about a rotational axis of the spring during a stage involving straightening the spring, so that a second end of the spring is mounted to a centering element, in order for the first end of the spring to contact the main stop after assembly, and the main stop and the secondary stop extend from a bottom of the bearing part in a same direction, wherein the method for assembling the suspension element comprises:
- a first step of positioning the spring on the bearing part in such a manner that the first end of the spring contacts the secondary stop,
- a second step involving straightening the spring while keeping the spring in contact with the bearing part, in order to mount the centering element to the second end of the spring,
- if the spring has pivoted during the second step involving straightening the spring, a stage in which the secondary stop is flattened by the spring to allow the first end of the spring contact the main stop,
- a third step of compressing the assembly.

12. The method for assembling the suspension element as claimed in claim 11, wherein the secondary stop has a surface facing a surface of the main stop in the axial direction of the coiled wire rod of the spring.

* * * * *